United States Patent
Goodwin

(10) Patent No.: US 10,378,933 B2
(45) Date of Patent: Aug. 13, 2019

(54) ENCODER HEAD DESIGNS

(71) Applicant: Nikon Corporation, Tokyo (JP)

(72) Inventor: Eric P. Goodwin, Tucson, AZ (US)

(73) Assignee: Nikon Corporation, Tokyo (JP)

( * ) Notice: Subject to any disclaimer, the term of this patent is extended or adjusted under 35 U.S.C. 154(b) by 598 days.

(21) Appl. No.: 14/519,027

(22) Filed: Oct. 20, 2014

(65) Prior Publication Data

US 2015/0108337 A1     Apr. 23, 2015

Related U.S. Application Data

(60) Provisional application No. 61/893,108, filed on Oct. 18, 2013.

(51) Int. Cl.
  *G01D 5/38* (2006.01)
  *G01D 5/347* (2006.01)

(52) U.S. Cl.
  CPC .......... *G01D 5/38* (2013.01); *G01D 5/34715* (2013.01)

(58) Field of Classification Search
  CPC .... G01D 5/3473; G01D 5/38; G01D 5/34715; G01D 5/347
  See application file for complete search history.

(56) References Cited

U.S. PATENT DOCUMENTS

| | | | | |
|---|---|---|---|---|
| 5,064,289 A | * | 11/1991 | Bockman | G01B 9/02019 356/485 |
| 5,404,220 A | * | 4/1995 | Takeuchi | G03F 9/7049 356/488 |
| 7,525,665 B2 | * | 4/2009 | Lee | G01B 9/02019 356/493 |
| 7,705,994 B2 | * | 4/2010 | Ray | G01B 9/02051 356/487 |
| 8,223,319 B2 | * | 7/2012 | Sato | G03F 7/70716 355/67 |
| 2006/0232828 A1 | * | 10/2006 | Salmon | G01S 3/789 358/448 |
| 2007/0146722 A1 | * | 6/2007 | Trutna, Jr. | G01D 5/266 356/487 |
| 2009/0237635 A1 | * | 9/2009 | Best | H01L 23/544 355/67 |
| 2009/0268210 A1 | * | 10/2009 | Prince | G01D 5/347 356/494 |
| 2012/0194824 A1 | * | 8/2012 | de Groot | G01B 9/02003 356/482 |
| 2013/0048842 A1 | | 2/2013 | Goodwin et al. | |
| 2013/0128249 A1 | * | 5/2013 | Redlitz | G03F 7/70958 355/67 |
| 2013/0128255 A1 | | 5/2013 | Liu | |
| 2014/0183345 A1 | | 7/2014 | Goodwin | |

* cited by examiner

*Primary Examiner* — Georgia Y Epps
*Assistant Examiner* — Don Williams
(74) *Attorney, Agent, or Firm* — Klarquist Sparkman, LLP

(57) ABSTRACT

Encoder systems provide measurement and reference optical paths based on propagation in a common set of optical elements along paths that are displaced angularly or spatially. Associated measurement and reference beams are reflected by corner cubes to as to define first paths and second paths. The measurement and reference beams are combined to determine a work piece displacement in a manufacturing process.

11 Claims, 12 Drawing Sheets

$XZ_{M+1} = 2x + Az + E_{fiber} + E_{DP}$    $YZ_{M+1} = 2y + Az + E_{fiber} + E_{DP}$    $E_{DP} = OPD_{Glass} + OPD_{Air}$ $XZ_{M-1} = -2x + Az + E_{fiber} + E_{DP}$   $YZ_{M-1} = -2y + Az + E_{fiber} + E_{DP}$   $LR = E_{fiber} - E_{DP}$ $x_{Meas} = (XZ_{M+1} - XZ_{M-1})/4 = [2x + Az + E_{fiber} + E_{DP} - (-2x + Az + E_{fiber} + E_{DP})]/4 = (4x)/4 = x$ $z_{Meas\_XZ} = (XZ_{M+1} + XZ_{M-1} - 2LR)/2A = [2x + Az + E_{fiber} + E_{DP} + -2x + Az + E_{fiber} + E_{DP} - 2(E_{fiber} - E_{DP})]/2A = 2Az/2A = z$

ENCODER HEAD DESIGNS

CROSS-REFERENCE TO RELATED APPLICATIONS

This application claims the benefit of U.S. Provisional Application 61/893,108, filed Oct. 18, 2013, which is incorporated herein by reference.

FIELD

The disclosure pertains to methods and apparatus for measuring displacements, particularly in lithographic apparatus.

BACKGROUND

Exposure apparatus are commonly used to transfer images from a reticle onto a semiconductor wafer during semiconductor processing. A typical exposure apparatus includes an illumination source, a reticle stage assembly that positions a reticle, an optical assembly, a wafer stage assembly that positions a semiconductor wafer, a measurement system, and a control system. The measurement system monitors the position of the reticle and the wafer, and the control system controls the stage assemblies to adjust the positions of the reticle and the wafer. Precise positioning is required for transferring small features typically required. Systems have been developed for determination and correction of positioning errors based on interference of measurement and reference beams such as those disclosed in Goodwin and Smith, U.S. Patent Application Publication 2013/0048842, and Liu, U.S. Patent Application Publication 2013/0128255, both of which are incorporated by reference. However, further improvements are needed, particularly to reduce cost and complexity.

SUMMARY

Disclosed herein are encoders in which measurement and reference beams tend to propagate in a common sets of optical elements and are displaced angularly or spatially. In some examples, corner cubes (solid or air) or other retroreflectors are situated to define first and second portions of an optical path so as to reduce introduction of additional angular differences between measurement and reference beams.

In one example, encoders comprise an optical system configured to provide a reference beam and a measurement beam, deliver the measurement beam to a grating situated at a target, and combine a diffracted portion of the measurement beam and the reference beam at an optical system output. The reference beam and the measurement beam traverse a common set of optical elements of the optical system in a first pass and a second pass, wherein a corner cube is situated so that the first pass is prior to reflection by the corner cube and the second pass is after reflection by the corner cube. A detection system is configured to receive the combined beams from the output and provide an estimate of a target position or displacement based on the combined beams.

The foregoing and other features and advantages will become more apparent from the following detailed description, which proceeds with reference to the accompanying figures.

DETAILED DESCRIPTION

Figure 1A:
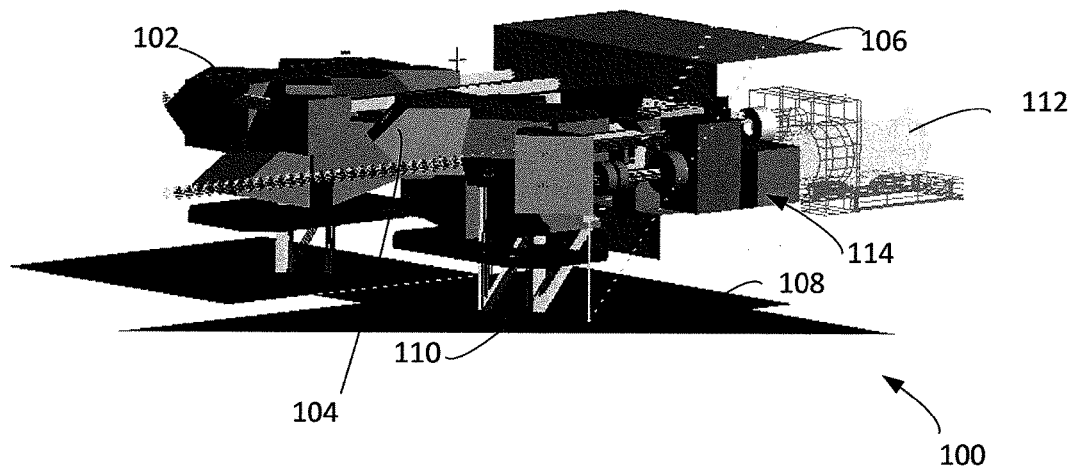
FIGS. 1A-1B are views of a representative encoder system.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Terms such as "above," "below," "under," "over," and the like are used to describe some examples. Such terms are used for convenient description and are not to be construed as requiring a particular arrangement or orientation of components. In some examples, propagation of optical beams is described as into or out of a plane of a drawing, and beam footprints representing such beams are shown as small circles.

REPRESENTATIVE ENCODER SYSTEMS

The disclosed encoders can include one or more anamorphic prisms to correct the effects of an encoder grating, and two passes from the grating with an imperfect corner cube in between to double sensitivity to x, y or z motions of the encoder grating while also reducing shear (lateral motion) as the grating (typically on a wafer stage) is moved up and down along a z-axis relative to the encoder head. The disclosed encoders are generally based on the following preferences. First, every (or most) components are traversed twice with a corner cube pass between each of the traverses so that any angle errors are removed or converted into a small, fixed shear. Second, measurement and reference beams are made to traverse as many common optical components as possible, either in a nearly collinear fashion or parallel but displaced, such that flatness of an optical surface is of greater concern rather than relative alignment of two physically separate optical components (for example, mirrors). Examples of such encoder systems are described in detail below.

Figure 1B:
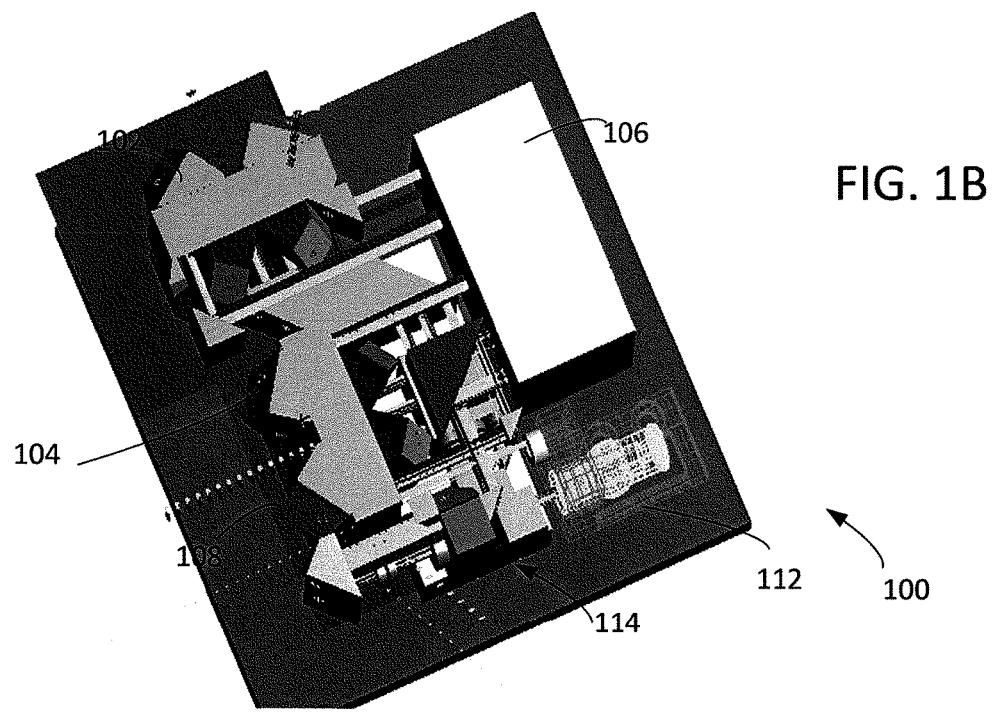

FIGS. 1A-1B are perspective views of an encoder system 100 that includes polarizing beam splitter (PBS)/corner cube assemblies 102, 104 that direct reference beams to a detector module 106. In addition, the assemblies 102, 104 direct measurement beams to a grating 108 so that the measurement beams are twice diffracted into +1 and −1 orders that are then routed by the assemblies 102, 104 along with the reference beams so as to propagate collinearly to the detector module 106. The grating 108 is generally periodic in two directions as described in Liu, U.S. Patent Application Publication 2013/0128255, which is incorporated herein by reference. A plurality 110 of input measurement beams and the associated diffracted beams are shown in FIGS. 1A-1B. Grating pitches can be different or the same in the two directions, or a grating that is periodic in a single direction can be used. A beam source 112 couples a combined measurement beam and reference beam, typically in orthogonal polarization states and at different frequencies so as to permit heterodyne detection, to an input optical assembly 114 that produces separate measurement and reference beams. In addition, a local reference beam that includes portions of both measurement and reference beams is produced. The measurement and reference beams are directed to the assemblies 102, 104 that are situated to produce and capture a twice diffracted measurement beam and combine with a reference beam. These beams are then directed to the detector module 106.

Figure 2:
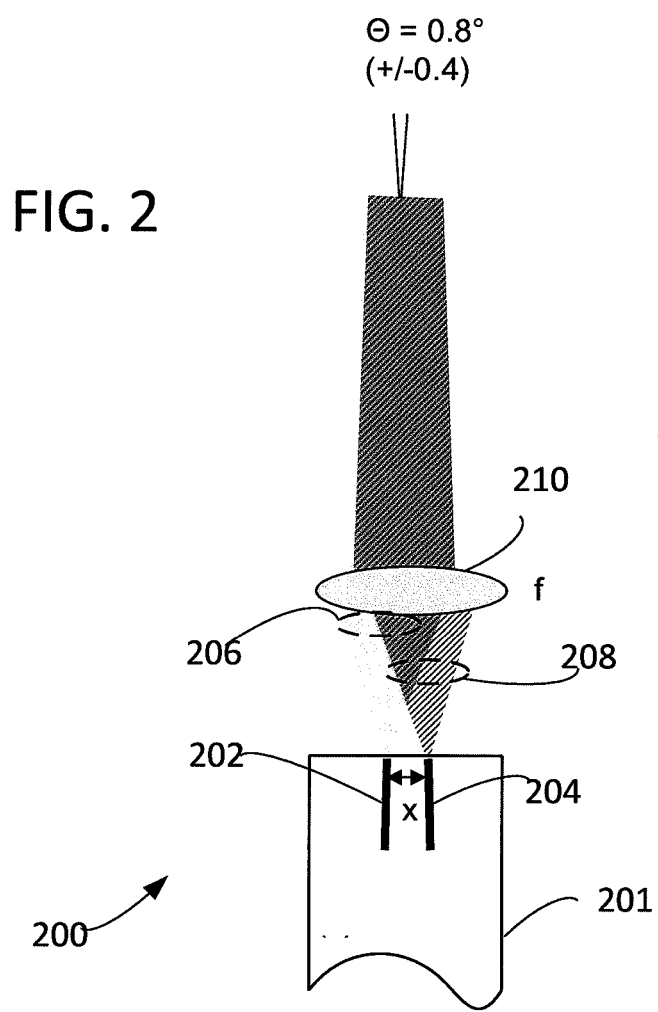
FIG. 2 illustrates a dual input fiber having two fiber cores in a single jacket separated by a distance x.

Reference and measurement beams can be obtained with an input optical system using two offset fiber cores. In an example shown in FIG. 2, a dual input fiber 201 has two fiber cores 202, 204 in a single jacket separated by a distance x. Beams 206, 208 from the two fiber cores are collimated by a lens 210 with focal length f, which in the example of FIG. 2, produces and angular separation of 0.8°. In this example, the reference beam is made parallel to a selected axis while the measurement beam is offset by 0.8 degrees and can be corrected further down the optical path, but other arrangements can be used in which the reference beam is offset or both beams are offset.

Figure 3:
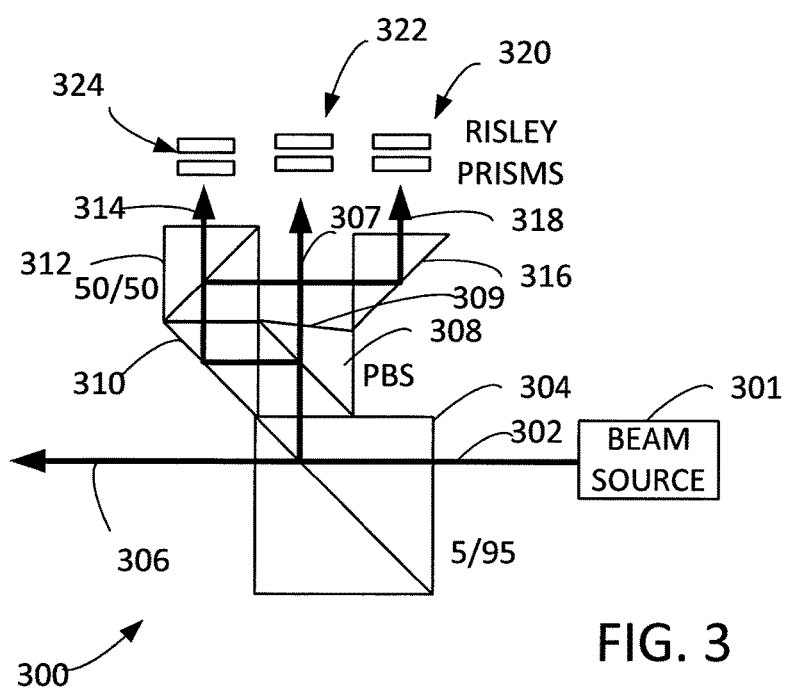
FIG. 3 illustrates an input optical module that produces a measurement beam and two reference beams having unequal path lengths.

Referring to FIG. 3, an input module 300 includes a beam source 301 (similar to that shown in FIG. 2) that produces a combined reference/measurement beam 302 that is directed to a beam splitter 304 (shown in FIG. 3 as a non-polarizing beam splitter with 5% transmittance and 95% reflectance). The combined beam 302 includes a measurement beam component and a reference beam component that are typically offset in frequency, are in different (substantially orthogonal) states of polarization, and propagate at slightly different angles. A local reference beam 306 is transmitted by the beam splitter 304, and includes portions of both the reference and measurement beam components produced by the beam source 301. A reference portion of the combined beam 302 is reflected by a polarizing beam splitter 308 to a prism 310 and a beam splitter 312 so as to produce a first reference beam 314 and a direct a second reference beam 318 to a right angle prism 316. A measurement portion of the combined beam 302 is transmitted by the PBS 308 to form a measurement beam 307. An exit surface 309 of the PBS 308 is tilted so as to control a propagation axis of the measurement beam 307. As shown in FIG. 3, the two reference beams 314, 318 have unequal air path lengths. This is generally satisfactory as long as local reference optical path difference (OPD) is equal to the average of the OPDs of the measurement interferometers. Risley prisms 320, 322, 324 are situated to permit adjustment of beam propagation directions. The parts in the input module 300 are the only ones in the entire system that can change the angles of the three beams (two reference and one measurement) relative to each other, so the Risley prisms are there to make any necessary corrections (and are typically the only parts that violate the common path or double pass design preferences outlined above). In the example of FIG. 3, the PBS 308 is wedged to correct a measurement beam 0.8° off-axis angle from a dual fiber input.

In order to prevent or reduce cyclic nonlinear error (CNLE), measurement and reference beams are generally not to be made collinear (parallel and overlapping simultaneously) until combined to interfere to provide a measurement. In prior art designs, beams either begin as spatially separated and parallel, and are made collinear using optics only traversed by the reference or measurement beam (leading to alignment errors as noted above). Alternatively, the measurement and reference beams are spatially overlapping and not parallel, and made parallel either using an expensive Wollaston prism or a set of optics unique to one of the beams. In the disclosed systems, the reference and measurement beams are initially produced as overlapping but propagating at different angles. They are separated and made nearly parallel but spatially separated. However, Risley prism pairs (pairs of wedges that can be rotated about the optical axis to introduce an angle change to the beam transmitted through the Risley prism pair) next to the input optics are used to correct assembly and fabrication errors. From this point forward along the optical paths, the optics can be arranged so that none of the design preferences are violated, i.e., all optics are either common to the measurement and reference beams or traversed twice with a corner cube in between.

Figure 5:
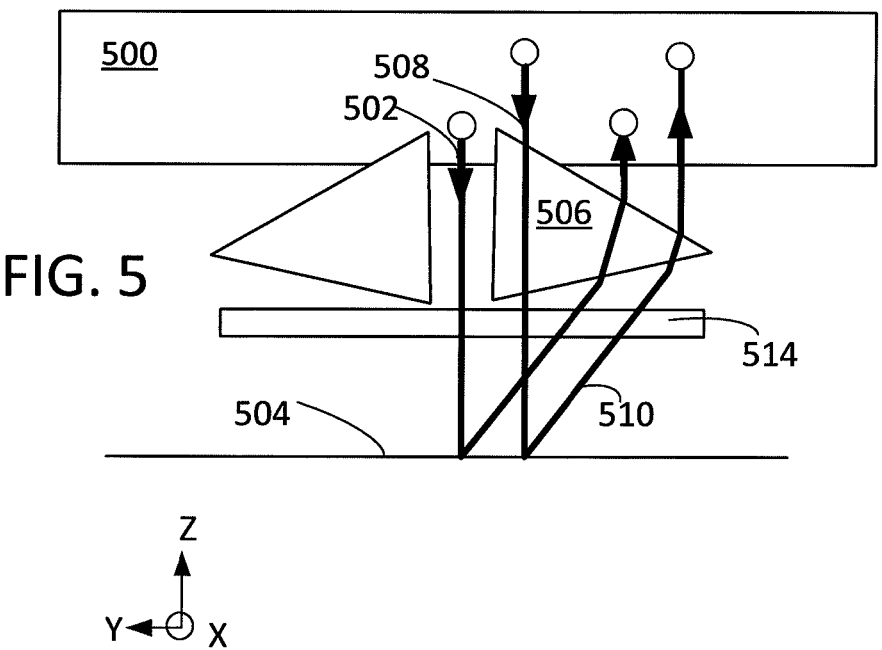
FIG. 5 illustrates propagation of beams associated with a YZ-module and measurement beam diffraction at an encoder grating.

Measurement and reference beams are displaced and propagate along slightly tilted, non-parallel axes. The displacement is fixed by positioning reference corner cubes at the right location to shift the retroreflected beam the proper amount to overlap a measurement beam. This reference corner cube cannot introduce angle errors because it is a corner cube. As noted above, the two beams are nearly parallel. The measurement beam, after being diffracted by a wafer stage grating, has the beam angle and anamorphic effect of the grating (i.e., a circular incident beam becomes an oval output beam) corrected by a diffraction correcting prism such as shown in FIG. 5. However, such a prism can be configured so that angular error is not perfectly corrected but that a 1° or other small angle remains a second pass beam on the grating relative to the first. In this way, a $0^{th}$ order (reflected beam) does not retrace a $2^{nd}$ pass beam path back to the first pass location, and makes another $0^{th}$ order reflection, and emerges parallel to the main measurement beam. A 1° angle is sufficient to prevent this. However, this means the measurement beam on the $2^{nd}$ pass does not diffract at the same angle as the first pass, which is nominally normally incident. Therefore the $2^{nd}$ pass through the diffraction correction prism does not make the final output beam exactly parallel to the input. Instead, there is a small angle (on the order of 10 arcseconds). The reference beam must also have this 10 arcsecond deviation, but the optics after the Risley prism (such as the prisms 320, 322, 324 shown in FIG. 3) cannot introduce a change in the reference beam angle. Therefore the Risley prisms are used to introduce this ~10 arcsec bias into the reference beam such that at the output lenses, the measurement and reference beams are collinear and parallel.

There can be a tradeoff associated with an angular bias. If the folded reference prism anamorphic properties are not equal to those of the grating, the reference beam will have a slight oval shape to it while the measurement remains round. It can be shown that the contrast loss from this oval reference beam is about 0.02%, which is negligible when compared with expected manufacturing tolerance errors. Therefore this is a very suitable tradeoff.

Figure 4A:
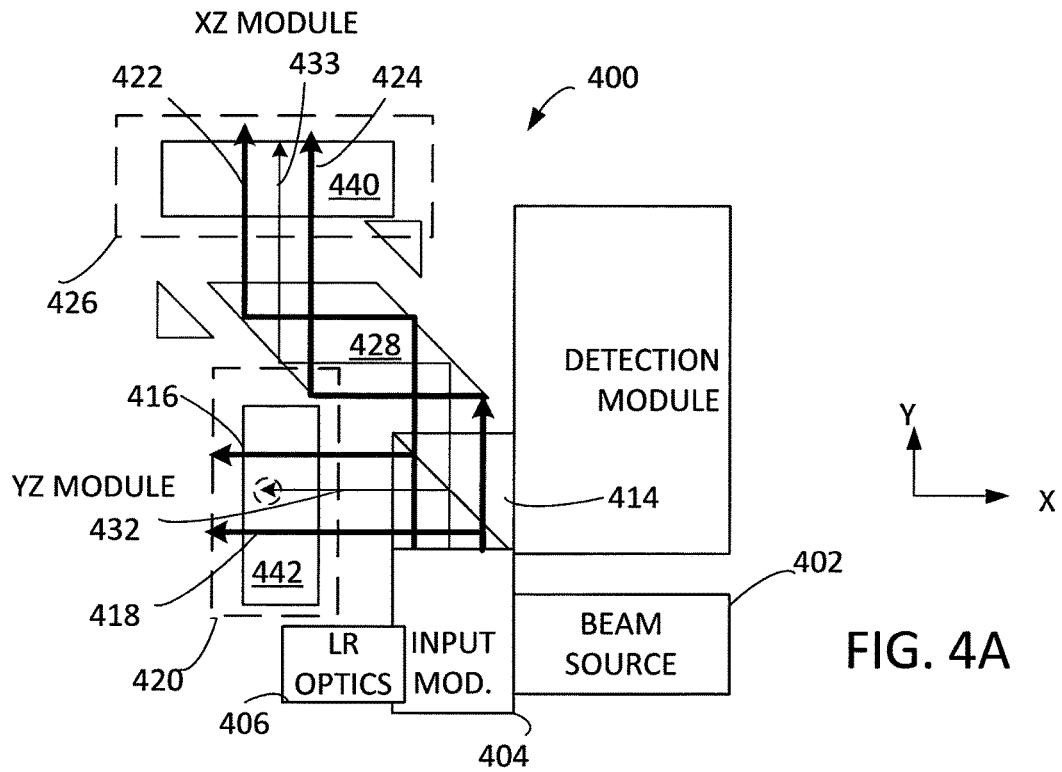
FIGS. 4A-4C are plan views of a representative encoder optical system illustrating reference beam paths (FIGS. 4A-4B) and measurement beam paths (FIG. 4C).
Figure 4B:
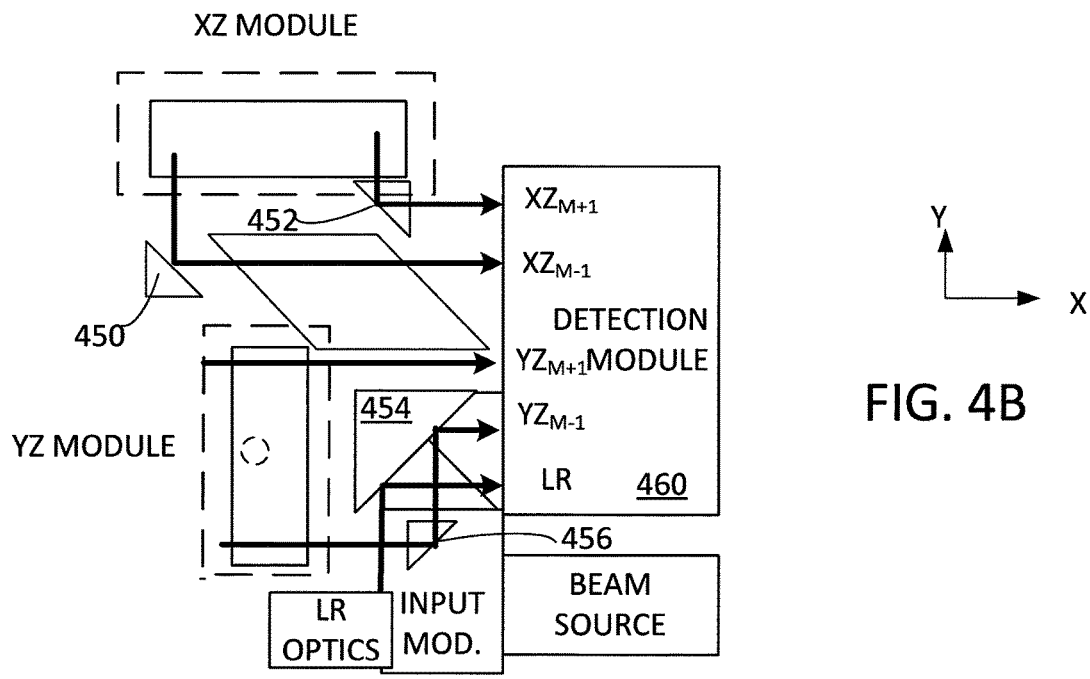

FIGS. 4A-4B are plan views of a representative encoder optical system illustrating beams at different z-axis positions. Referring to FIG. 4A, an encoder system 400 includes a beam source 402 (such as that of FIG. 2) that produces a combined measurement/reference optical beam that is directed to an input module 404 such as shown in FIG. 3. A local beam (a mixture of measurement and reference beams) is transmitted to and controlled by local reference optics 406, discussed in detail below. Additional reference beams are transmitted to a non-polarizing beam splitter 414 that produces reference beams 416, 418 that are directed to a YZ-optical module 420. Reference beams 422, 424 are directed to an XZ-optical module 426 by reflections from a rhomb 428. A measurement beam from the input module 404 is similarly reflected and transmitted by the beam splitter 414 and is incident to the XZ-module 426 after reflection by the rhomb 428. The YZ-module 420 and the XZ-module 426 include respective polarizing beam splitters 442, 440 that direct measurement beams such as the beam 432 in a z-direction (into the page of FIG. 4A) to a grating secured to a wafer stage.

As shown in FIG. 4B, upon reflection at the YZ-module 420 and the XZ-module 426, the reference beams propagate in a plane that is above (out of the page in FIG. 4B) that of the input reference beams as shown in FIG. 4A. Additional prisms or other beam directing elements such as right angle prisms 450, 452, 454, 456 are situated to return the reference beams to a detection module 460. Typically, the detection module 460 includes optical fibers and focusing elements to receive respective reference/measurement beam combinations. The reference beams are returned to the detection module 460 along with respective overlapping and collinear propagating measurement beams returned after being twice-diffracted by a substrate stage mounted grating.

Figure 4C:
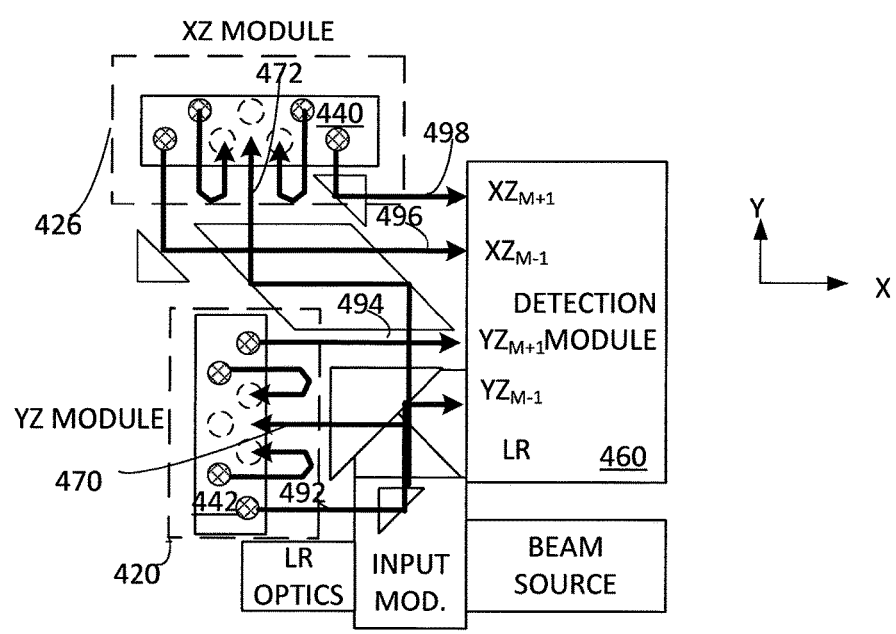

Measurement beams for the encoder system 400 are shown in FIG. 4C. Input measurement beams 470, 472 are coupled to the XZ-module 426 and the YZ-module 420, respectively, and are reflected toward a grating (into the plane of FIG. 4C) by the polarizing beam splitters (PBSs) 440, 444. Diffracted beams are returned to the PBSs 440, 442 and are reflected by respective corner cube assemblies along paths for another reflection at the PBSs 440, 442 and be diffracted again. The doubly diffracted measurement beams are returned to the YZ-module 420 or the XZ-module 426 and directed as output measurement beams 492, 494, 496, 498 to the detection module. These output measurement beams are overlapping and collinear with corresponding reference beams shown in FIG. 4B, and propagate in a plane above a plane that contains the input measurement beams 470, 472. In FIG. 4C, beam propagation in the XZ- and YZ-modules in a z-direction (perpendicular to the plane of the drawing) is indicated with circles representing beam footprints. Diffracted beam footprints are indicated as cross-hatched circles.

Note that one set of Risley prisms controls two reference beams. For example, the Risley prisms 324 of FIG. 3 control a reference beam that is subsequently divided into reference beams for an XZ-module and a YZ-module. Thus, a single set of Risley prisms controls the angle of the $XZ_{M+1}$ and the $YZ_{M-1}$ reference beams and another set controls the angle of the angle of the $YZ_{M+1}$ and the $XZ_{M-1}$ reference beams. Note that the 10 arcsec bias in the measurement beams is diverging slightly away from the grating normal. Since there are a different number of reflections for the XZ and YZ reference beams as they propagate to the XZ and YZ modules, respectively, the parity flips and the same reference beam is useful for the +1 order in one module and the −1 order in the other module. In other words, by design, one setting of the Risley prisms provides the right reference beam angle for both outputs. However, by using a reference beam that has different anamorphic properties, the beams can start off spatially separated and not parallel, and end up collinear while adhering to the above noted design preferences because the anamorphic properties of the folded reference prism are similar yet different from the grating.

FIG. 5 illustrates propagation of beams associated with a YZ-module 500. A first pass measurement beam 502 is diffracted at a grating 504 and the diffracted beam is incident to a wedge prism 506 that alters a beam propagation direction so at to be approximately parallel to a z-axis direction (i.e, biased at a slight angle such as about 1°. The YZ-module 500 returns a measurement beam 508 that is directed to the grating 504 and diffracted along a path 510. Only a single diffraction order is shown but typically, the system is symmetric about the initial input beam, and −1 and +1 diffraction orders are produced. Note that the second pass measurement beam (508) is transmitted through an opening in the wedge prism 506 so that it is not refracted by the wedge prism 506. The second pass measurement beam 508 is incident at an angle of about 1 degree relative to the nominal grating normal to prevent stray light from ending up parallel to the measurement beams. A protective window 514 prevents stray water droplets or other contaminants from getting inside the encoder head housing and dirtying the optics. Diffraction of a measurement beam from an XZ-module is similar.

Figure 6:
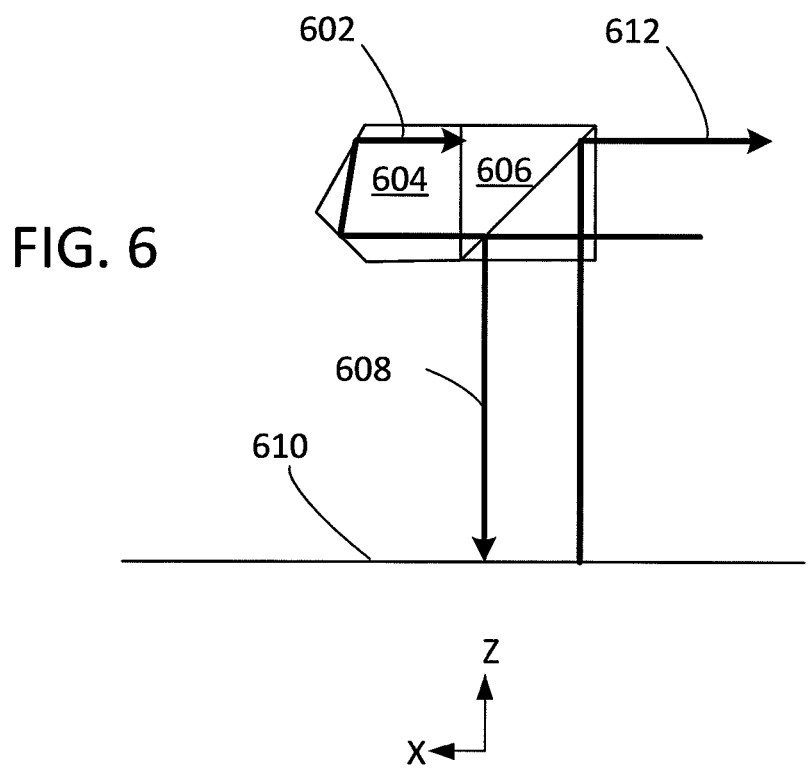
FIG. 6 is a simplified plan view of a YZ-module illustrating superposition of a reference beam and a twice diffracted measurement beam.

FIG. 6 is a simplified side view of an XZ- or YZ-module that shows a reference beam 602 as returned by a reference beam corner cube 604 to a polarizing beam splitter 606. A measurement beam 608 is incident to a grating 610 and after being twice diffracted returns as output measurement beam 612 so as to be reflected by the PBS 606 and combined with the reference beam transmitted by the PBS 606.

Figure 7:
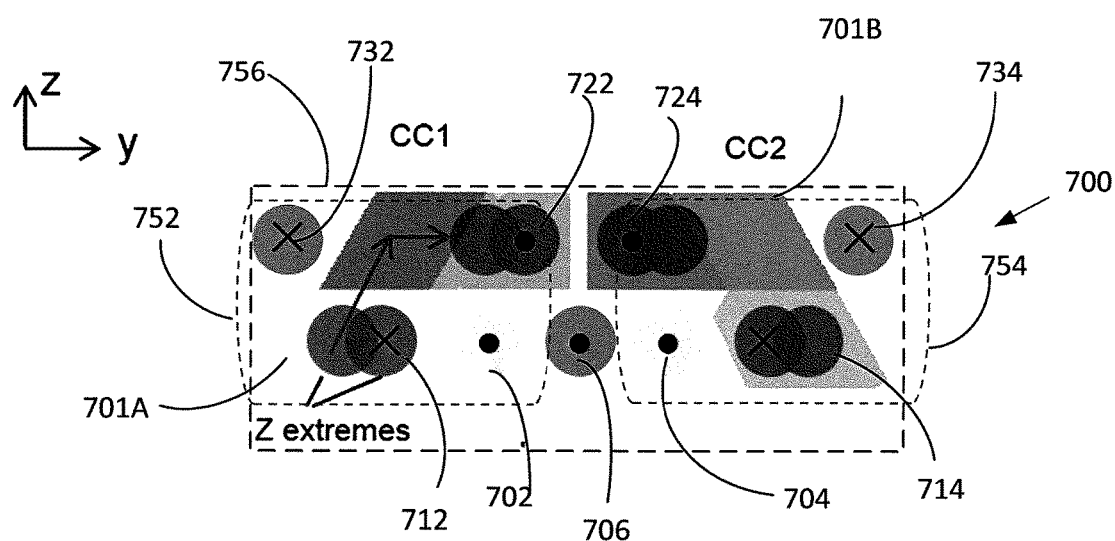
FIG. 7 illustrates lateral shifts of measurement beams at measurement beam corner cubes such as those shown in FIG. 8.

Referring to FIG. 7, a corner cube assembly 700 that directs measurement beams to and from a grating includes first and second corner cubes 701A, 701B. In the configuration of FIG. 7, a PBS and reference beam corner cubes would be situated above the plane of FIG. 7; reference beam corner cube outlines are indicated as 752, 754 and a PBS is outlined as 756 for purposes of illustration. Input reference beams 702, 704 (propagating out of the plane of FIG. 7) are transmitted by a respective PBS to the respective reference beam corner cubes. A measurement beam 706 is reflected by the PBS to be diffracted in a selected diffraction order (for example, a +1 order) at a stage grating and the diffracted beam is returned at 712 to be reflected by the corner cube 701A as a beam 722 that is again directed to the stage grating. Upon a second diffraction, the doubly diffracted measurement beam and a reference beam are combined at the PBS 756 in a beam 732 that propagates to a detection system. The measurement beam 706 is also diffracted into a second order that is returned at 714 to be reflected by the corner cube 701B as a beam 724 that is again directed to the stage grating. Upon a second diffraction, the doubly diffracted measurement beam and a reference beam are combined in a beam 734 that propagates to a detection system.

Figure 8:
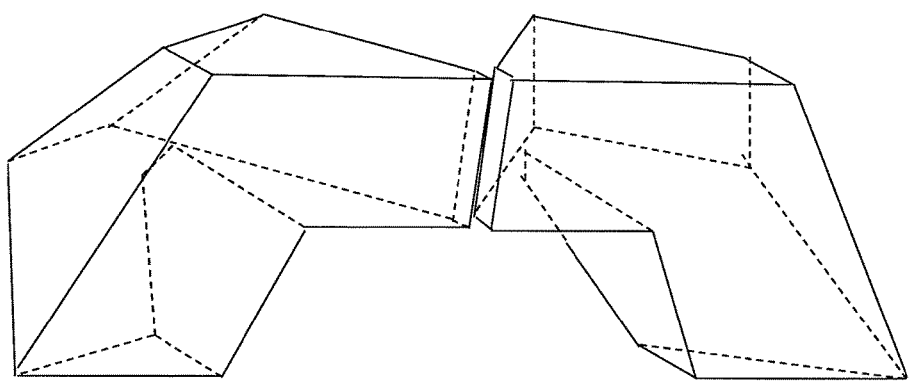
FIG. 8 illustrates corner cubes trimmed to avoid obstruction of input and output beams.

Referring to FIG. 8, measurement beam corner cubes are shown as trimmed to allow input and output beams to propagate by them without obstruction. Typically, the prisms are just big enough to capture and return the measurement beams as the wafer stage moves through a complete entire z range (+/−1 mm), causing a lateral shift of the input position of the beam into the corner cubes as illustrated in FIG. 7 (at z extremes). Such corner cubes may appear unusual, but can be formed of conventional corner cubes with several sections removed. The removed sections correspond to mechanical changes and new surfaces created need not be optical surfaces (i.e., surfaces used by a beam, either in reflection or transmission). As shown in FIG. 7, in one example, as wafer stage moves up and down by 1 mm, the location of the measurement beam on the input aperture of the corner cube shifts in y (for a YZ-module anyway). This sets the minimum size of the corner cube, such that this entire range of beam shifts can be captured and returned to the grating for a second pass.

Figures 9, 10:
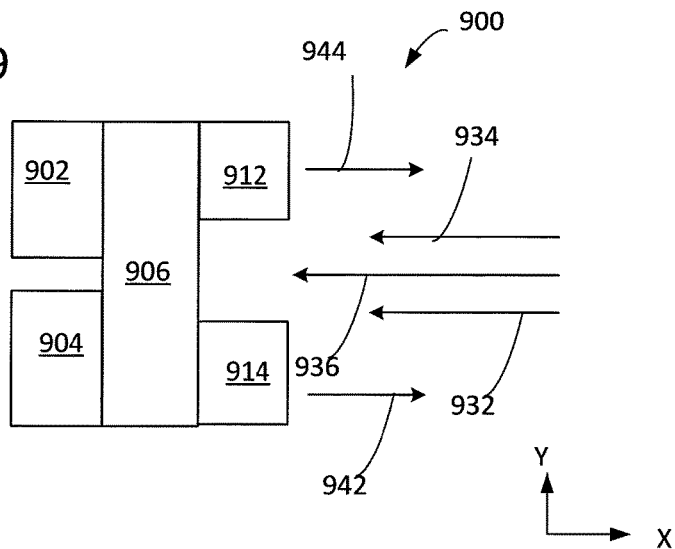
FIG. 9 is a simplified plan view of a YZ- or XZ-optical module.
FIG. 10 illustrates relationships between output signals and measured quantities produced by an encoder system such as that of FIGS. 4A-4C.

FIG. 9 is a simplified depiction of an XZ- or YZ-module. A module 900 includes reference beam corner cubes 902, 904, a beam splitter 906 (typically a PBS that can efficiently separate reference and measurement beams), and measurement beam corner cubes 912, 914. Representative reference beams 932, 934 and measurement beam 936 are shown as propagating toward the module 900. Combined doubly diffracted measurement beams and reference beams 942, 944 are situated to propagate to a detection system.

FIG. 10 illustrates relationships between output signals and measured quantities (x, y, z and $\theta_x$), wherein A is the sensitivity to z which depends on the design and in one example is ~4.08 nm phase change/nm of z change. $E_{fiber}$ is a phase difference experienced between the two light frequencies (measurement and reference) in heterodyne detection for differences accumulated prior to incidence on the input beam splitter, $E_{DP}$ is the error due to the deadpath mismatch between the measurement and reference beams, which can lead to thermal sensitivity if the entire assembly temperature changes (in the modules, the measurement path is longer in both glass and air). The local reference makes the measurement beam have the longer path in glass and air, equivalent to that of the XZ and YZ signals. Then, when the LR signal is subtracted from the z measurement, any global temperature change induced error is corrected. Equations for XZ are shown in FIG. 10 and YZ equations are the same, with X's changed to Ys.

Figure 11:
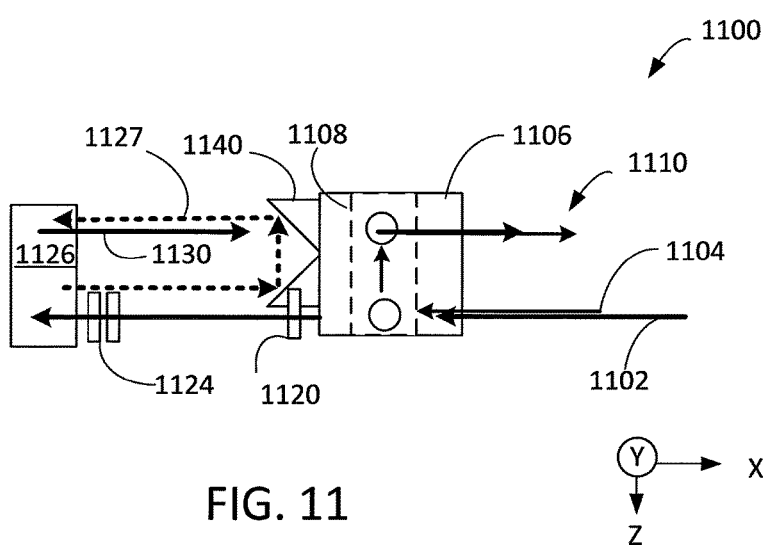
FIG. 11 illustrates a representative local reference (LR) optical system.

FIG. 11 illustrates a representative local reference (LR) optical system 1100 such as the LR system 406 of FIGS. 4A-4C. An angularly offset measurement beam 1102 and a reference beam 1104 are incident to a PBS 1106 that reflects the reference beam 1104 to a roof prism 1108 situated behind the PBS 1106 as illustrated. The angular offset of the measurement beam 1102 and the reference beam 1104 is in the xy-plane and is not visible in the xz-plane of FIG. 11. In one example, the roof prism 1108 is an "air" roof prism defined by a plurality of air-spaced reflective surfaces. The roof prism 1108 returns the beam to the PBS 1106 so as to be reflected as part of a combined measurement/reference output beam 1110. The measurement beam 1102 is transmitted by the PBS 1106 through a wedge 1120 that adjusts the beam propagation direction to Risley prisms 1124 and a roof prism 1126. The roof prism 1126 directs the measurement beam in a y-direction (into the plane of FIG. 11) as a beam 1127 that is incident to an air roof prism 1140. The beam 1127 is returned to the roof prism 1126 by the air roof prism 1140. A returned measurement beam 1130 (in the plane of FIG. 11 and the input measurement beam 1102 is transmitted by the PBS 1106 to form part of the combined beam 1110. This combination permits matching of optical paths in glass and air.

As shown in FIG. 11, a wedge is used to correct the angle of the measurement beam just after the PBS 1106. This wedge and the other components in the LR optical system 1100 do not have to be placed perfectly as there is another Risley prism pair that is used to correct the angle errors in mounting of these parts (which violate the preferred design guidelines set forth above). However, the two optical elements of concern in the LR optical system 1100 are roof prisms that do not create angle errors for rotations about one axis as opposed to all three axes in a corner cube retroreflector.

EXAMPLE EXPOSURE APPARATUS AND ASSOCIATED METHODS

Figure 12:
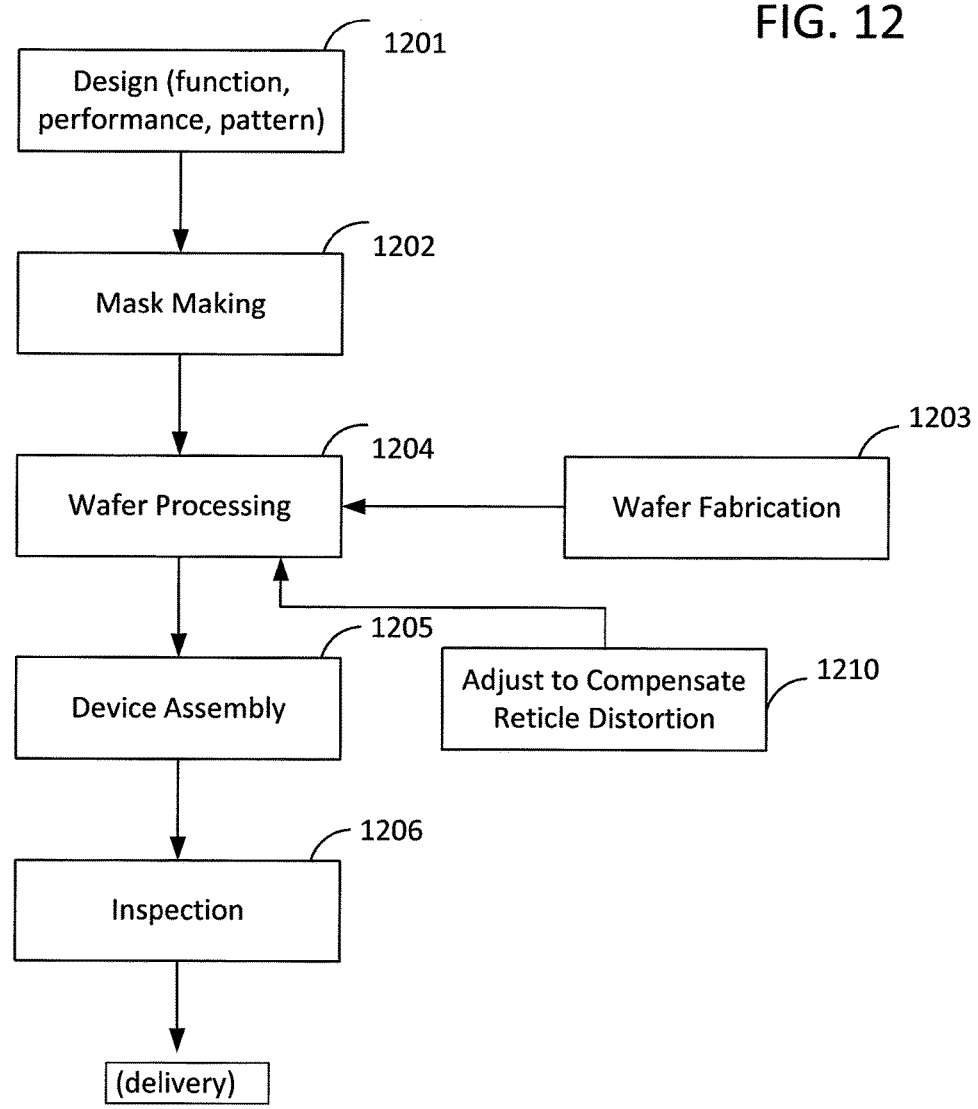
FIG. 12 is a process-flow diagram depicting exemplary steps associated with a process for fabricating semiconductor devices.

The disclosed encoder methods and apparatus can be used in conjunction with various precision systems such as various types of lithography systems and other wafer processing systems and methods. Semiconductor devices can be fabricated by processes including microlithography steps performed using a microlithography system as described above. Referring to FIG. 12, in step 1201 the function and performance characteristics of the semiconductor device are designed. In step 1202 a reticle ("mask") defining the desired pattern is designed and fabricated according to the previous design step. Meanwhile, in step 1203, a substrate (wafer) is fabricated and coated with a suitable resist. In step 1204 ("wafer processing") the reticle pattern designed in step 1202 is exposed onto the surface of the substrate using the microlithography system. In a step 1210, reticle distortion can be estimated during exposure as described above. In step 1205 the semiconductor device is assembled (including "dicing" by which individual devices or "chips" are cut from the wafer, "bonding" by which wires are bonded to particular locations on the chips, and "packaging" by which the devices are enclosed in appropriate packages for use). In step 1206 the assembled devices are tested and inspected.

Figure 13:
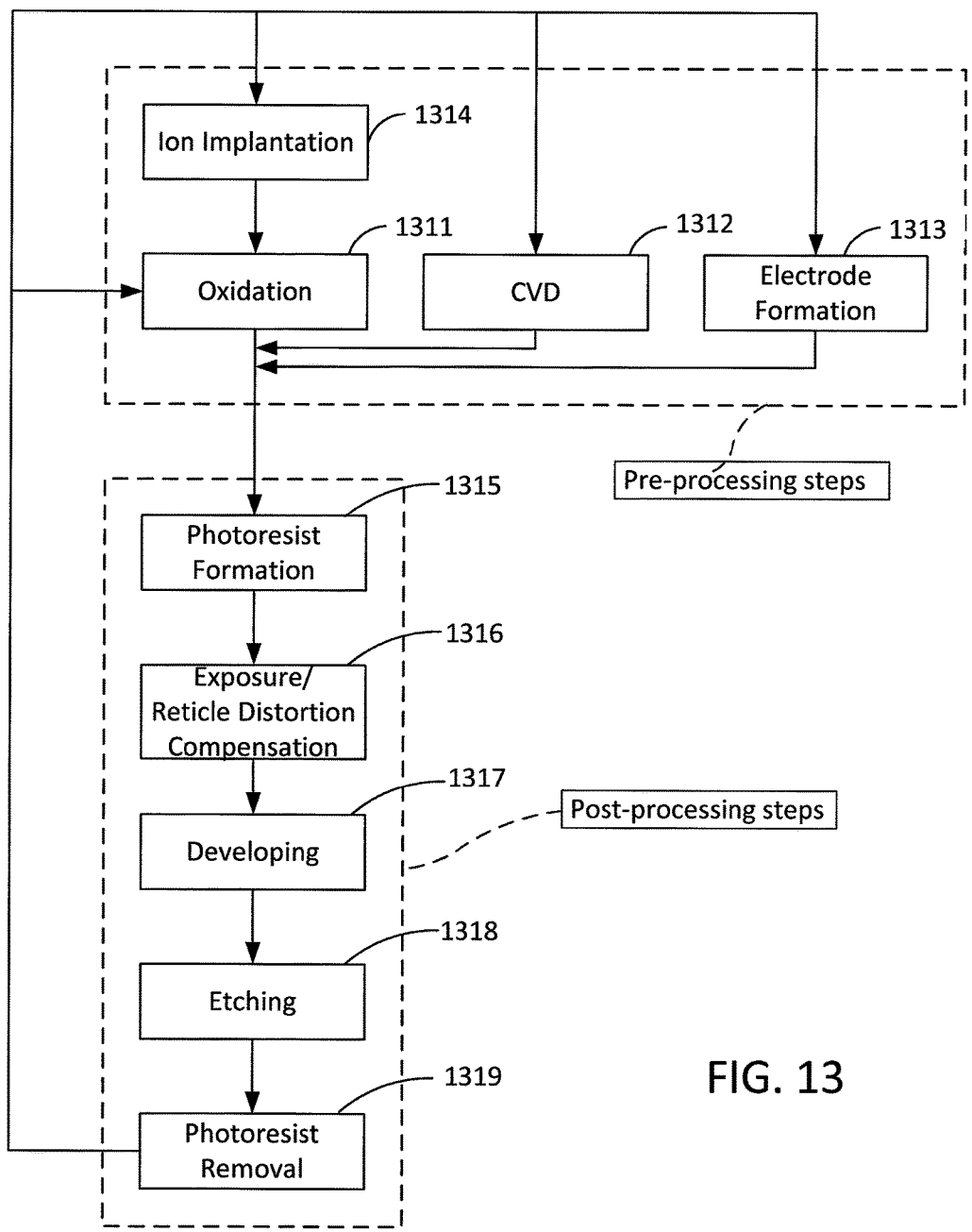
FIG. 13 is a process-flow diagram depicting exemplary steps associated with a processing a substrate (e.g., a wafer), as would be performed, for example, in the process shown in FIG. 12.

Representative details of a wafer-processing process including a microlithography step are shown in FIG. 13. In step 1311 ("oxidation") the wafer surface is oxidized. In step 1312 ("CVD") an insulative layer is formed on the wafer surface by chemical-vapor deposition. In step 1313 (electrode formation) electrodes are formed on the wafer surface by vapor deposition, for example. In step 1314 ("ion implantation") ions are implanted in the wafer surface. These steps 1311-1314 constitute representative "pre-processing" steps for wafers, and selections are made at each step according to processing requirements.

At each stage of wafer processing, when the pre-processing steps have been completed, the following "post-processing" steps are implemented. A first post-process step is step 1315 ("photoresist formation") in which a suitable resist is applied to the surface of the wafer. Next, in step 1316 ("exposure"), the microlithography system described above is used for lithographically transferring a pattern from the reticle to the resist layer on the wafer. Reticle distortion can be compensated during pattern transfer. In step 1317 ("developing") the exposed resist on the wafer is developed to form a usable mask pattern, corresponding to the resist pattern, in the resist on the wafer. In step 1318 ("etching"), regions not covered by developed resist (i.e., exposed material surfaces) are etched away to a controlled depth. In step 1319 ("photoresist removal"), residual developed resist is removed ("stripped") from the wafer.

Formation of multiple interconnected layers of circuit patterns on the wafer is achieved by repeating the pre-processing and post-processing steps as required. Generally, a set of pre-processing and post-processing steps are conducted to form each layer.

Figure 14:
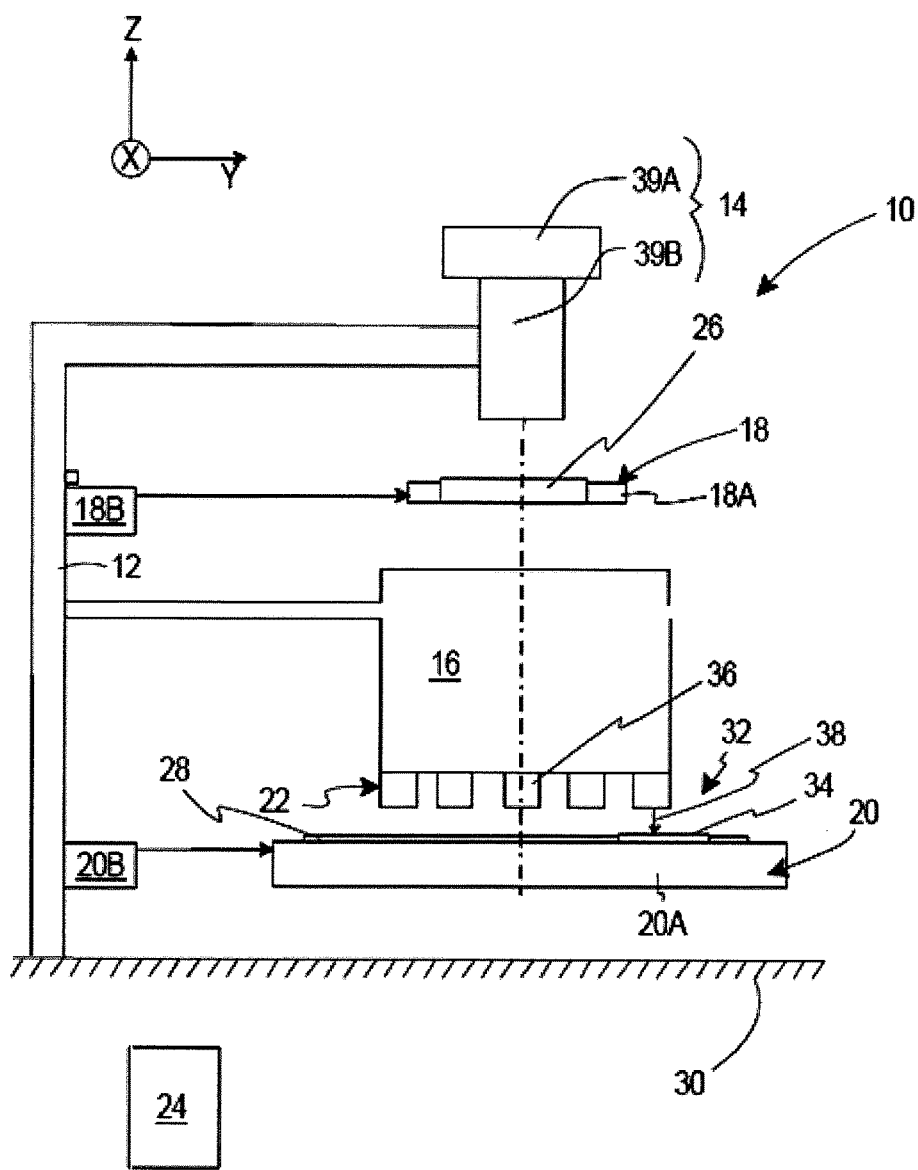
FIG. 14 is a representative exposure apparatus that includes an encoder as disclosed herein.

FIG. 14 is a schematic illustration of a precision assembly, namely an exposure apparatus 10. The exposure apparatus 10 includes an apparatus frame 12, an illumination system 14 (irradiation apparatus), an optical assembly 16, a reticle stage assembly 18, a wafer stage assembly 20, a measurement system 22, and a control system 24. The design of the components of the exposure apparatus 10 can be varied to suit the design requirements of the exposure apparatus 10.

An orientation system that can include an X axis, a Y axis that is orthogonal to the X axis, and a Z axis that is orthogonal to the X and Y axes. It should be noted that any of these axes can also be referred to as the first, second, and/or third axes.

The exposure apparatus 10 is particularly useful as a lithographic device that transfers a pattern (not shown) of an integrated circuit from a reticle 26 onto a semiconductor wafer 28. The exposure apparatus 10 mounts to a mounting base 30, e.g., the ground, a base, or floor or some other supporting structure.

As an overview, the measurement system 22 includes an encoder assembly 32 that measures relative movement of a first object and a second object, the first object and the second object being movable relative to each other. For example, the measurement system 22 can measure the position of a work piece (the first object), e.g. the wafer 28 relative to a reference (the second object) e.g. the optical assembly 16, with improved accuracy. In this embodiment, the work piece is moved relative to the reference.

In one embodiment, the encoder assembly 32 can be designed to monitor the position and/or relative movement of the work piece 28 along three axes (along the X, Y, and Z axes) and about one axis ($\theta_x$) relative to the reference. In FIG. 1, the encoder assembly 32 includes a measurement grating 34 that is secured to a top of a stage, e.g., a wafer stage 20A, that retains the work piece 28, and one or more fixed encoder heads 36 that are secured to the optical assembly 16 to monitor the position of the work piece 28. In this embodiment, each encoder head 36 directs one or more measurement beams 38 (only one is illustrated in FIG. 14) toward the stage 20A and/or toward the measurement grating 34 that is secured to the stage 20A. Alternatively, for example, the one or more encoder heads 36 can be mounted on the wafer stage 20A, and the measurement grating 34 can be mounted to the optical assembly 16.

In this embodiment, each encoder head 36 can be used to monitor the position of the work piece 28 along three axes (along the X, Y, and Z axes) and about one axis ($\theta_x$) when the measurement grating 34 is positioned below it. Thus, as the stage 20A and the measurement grating 34 are moved relative to the encoder heads 36, the encoder head 36 positioned above the measurement grating 34 will be used to monitor the position.

The number of encoder heads 36 can be varied according to the design of the system and the amount of travel of the stage 20A. It should be noted that the five encoder heads 36 illustrated in FIG. 14 is just an example, and the actual number of encoder heads 36 can be greater than or fewer than five. For example, the encoder assembly 32 can include fourteen encoder heads 36 mounted in a line to measure a large distance of the stage along the Y axis. Additionally, it should be noted that the use of multiple encoder heads 36 enables the encoder assembly 32 to more accurately measure the position of the grating 34, and thus the position of the work piece 28 that is retained by the stage 20A, due to the stage 20A and the grating 34 moving relative to the encoder heads 36. As provided herein, to effectively switch between encoder heads 36, the footprint of the measurement beams 38 needs to be small.

Moreover, as provided herein, in certain embodiments, the encoder assembly 32 enables such features as: (i) improved light efficiency; (ii) improved contrast (i.e. contrast loss due to shear of the measurement beams as the grating 34 moves along the z-axis 38 is inhibited); (iii) a relatively small encoder head footprint; (iv) a relatively small measurement beam footprint; (v) inhibiting of cyclic non-linear error (CNLE), or stray light rejection; (vi) acceptable dead path (where dead path is the difference in path length in air and glass traversed by the measurement and reference beams); (vii) reduced non-common path (where non-common path describes the reference beam paths taking place in air or glass far from or independent of the measurement beam); and (viii) a small number of components, such that the components should be easy to align. As a result thereof, encoder heads 36 can be more easily fabricated, the wafer 28 can be positioned with improved accuracy, and the exposure apparatus 10 can be used to manufacture higher density wafers 28.

There are a number of different types of lithographic devices. For example, the exposure apparatus 10 can be used as a scanning type photolithography system that exposes the pattern from the reticle 26 onto the wafer 28 with the reticle 26 and the wafer 28 moving synchronously. Alternatively, the exposure apparatus 10 can be a step-and-repeat type photolithography system that exposes the reticle 26 while the reticle 26 and the wafer 28 are stationary. However, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head.

The apparatus frame 12 is rigid and supports the components of the exposure apparatus 10. The apparatus frame 12 illustrated in FIG. 1 supports the reticle stage assembly 18, the optical assembly 16, the wafer stage assembly 20, and the illumination system 14 above the mounting base 30.

The illumination system 14 includes an illumination source 39A and an illumination optical assembly 39B. The illumination source 39A emits a beam (irradiation) of light energy. The illumination optical assembly 39B guides the beam of light energy from the illumination source 39A to the optical assembly 16. The beam of light energy selectively illuminates different portions of the reticle 26 and exposes the wafer 28.

The illumination source 39A can be a g-line source (436 nm), an i-line source (365 nm), a KrF excimer laser (248 nm), an ArF excimer laser (193 nm), a $F_2$ laser (157 nm), or an EUV source (13.5 nm). Alternatively, the illumination source 39A can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 26 to the wafer 28. Depending upon the design of the exposure apparatus 10, the optical assembly 16 can magnify or reduce the image illuminated on the reticle 26. The optical assembly 16 need not be limited to a reduction system. It could also be a 1× or magnification system.

The reticle stage assembly 18 holds and positions the reticle 26 relative to the optical assembly 16 and the wafer 28. In FIG. 1, the reticle stage assembly 18 includes a reticle stage 18A that retains the reticle 26, and a reticle stage mover assembly 18B that positions the reticle stage 18A and the reticle 26. The reticle stage mover assembly 18B can be designed to move the reticle 26 along the X, Y and Z axes, and about the X, Y and Z axes.

Somewhat similarly, the wafer stage assembly 20 holds and positions the wafer 28 with respect to the projected image of the illuminated portions of the reticle 26. In FIG. 1, the wafer stage assembly 20 includes the wafer stage 20A that retains the wafer 28, and a wafer stage mover assembly 20B that positions the wafer stage 20A and the wafer 28. The wafer stage mover assembly 20B can be designed to move the wafer 28 along the X, Y and Z axes, and about the X, Y and Z axes. In this embodiment, the wafer 28 can be scanned while the wafer stage assembly 20 moves the wafer 28 along the Y axis. In FIG. 14, the measurement grating 34 is fixedly secured to the top of the wafer stage 20A.

The measurement system 22 monitors movement of the reticle 26 and the wafer 28 relative to the optical assembly 16 or some other reference. With this information, the control system 24 can control the reticle stage assembly 18 to precisely position the reticle 26 and the wafer stage assembly 20 to precisely position the wafer 28. For example, the measurement system 22 can utilize multiple laser interferometers, encoders, autofocus systems, and/or other measuring devices in addition to the encoder assembly 32.

The control system 24 is connected to the reticle stage assembly 18, the wafer stage assembly 20, and the measurement system 22. The control system 24 receives information from the measurement system 22 and controls the stage assemblies 18, 20 to precisely position the reticle 26 and the wafer 28. The control system 24 can include one or more processors and circuits The above examples are provided in order to illustrate selected embodiments, but the invention is not to be limited by features in any particular embodiment. I claim all that is encompassed by the appended claims.

I claim:

1. An encoder apparatus, which measures a relative movement with respect to a grating, the apparatus comprising:
    a light source situated to emit a measurement beam and first and second reference beams;
    an optical system including a beam splitter situated to reflect or transmit the measurement beam from the light source and situated to transmit or reflect the first and second reference beams, to direct the measurement beam from the beam splitter to a diffraction grating, to direct first and second diffracted beams which are caused by diffraction of the measurement beam irradiated on the diffraction grating, received from the diffraction grating, from first and second positions on the beam splitter and along first and second propagation directions respectively, and to direct the first reference beam from the first position along the first propagation direction and the second reference beam from the second position along the second propagation direction; and
    a detector situated to detect an interference of the first diffracted beam and the first reference beam, and an interference of the second diffracted beam and the second reference beam.

2. The encoder apparatus of claim 1, wherein the optical system further comprises a retro-reflector situated to direct the first and second reference beams from the beam splitter to the beam splitter.

3. The encoder apparatus of claim 1, wherein the optical system is situated to direct the first diffracted beam to the diffraction grating so as to diffract and to be received at the first position, and to direct the second diffracted beam to the diffraction grating so as to diffract and to be received at the second position.

4. The encoder apparatus of claim 1, further comprising a beam divider situated to divide a beam from the light source so as to generate the measurement beam and the first and second reference beams based on the divided beam.

5. The encoder apparatus of claim 1, wherein the measurement beam and the first and second reference beams propagating from the light source to the optical system are displaced from each other.

6. The encoder apparatus of claim 5, wherein the measurement beam and the first and second reference beams propagating from light source to the optical system are displaced by at least 0.5, 1.0, 1.5, or 2.0 times a beam diameter.

7. The encoder apparatus of claim 1, wherein the measurement beam and the first and second reference beams propagating from light source to the optical system are non-parallel to each other.

8. The encoder apparatus of claim 7, wherein the measurement beam and the first and second reference beams propagating from light source to the optical system are displaced by at least 0.2, 0.4, 0.6, 0.8, or 1.0 degrees.

9. An exposure apparatus which expose a pattern on a workpiece, comprising:
   a frame;
   a stage which holds the workpiece and which is movable along at least a first direction with respect to the frame; and
   the encoder apparatus of claim 1 situated to measure a relative movement of the frame and the stage along at least the first direction.

10. A device manufacturing method including a lithographic process, comprising exposing a workpiece by using the exposure apparatus of claim 9 in the lithographic process.

11. The encoder apparatus of claim 1, wherein the light source is situated to emit the first reference beam to propagate along a first axis and the second reference to propagate along a second axis different from the first axis.

* * * * *